United States Patent

Belanger et al.

[11] Patent Number: 5,813,077
[45] Date of Patent: *Sep. 29, 1998

[54] SPHERICAL BEARING ARRANGEMENT FOR VEHICLE LAUNDRY BRUSH

[75] Inventors: Michael J. Belanger, Novi; Robert J. Wentworth, Farmington Hills, both of Mich.

[73] Assignee: Belanger, Inc., Northville, Mich.

[ * ] Notice: The term of this patent shall not extend beyond the expiration date of Pat. No. 5,709,002.

[21] Appl. No.: 848,504

[22] Filed: Apr. 28, 1997

Related U.S. Application Data

[63] Continuation-in-part of Ser. No. 641,116, Apr. 29, 1996, Pat. No. 5,709,002.

[51] Int. Cl.$^6$ .................................................. B60S 3/06
[52] U.S. Cl. ........................ 15/97.3; 15/53.2; 15/53.3; 15/DIG. 2
[58] Field of Search ..................... 15/53.1–53.4, 15/97.3, DIG. 2

[56] References Cited

U.S. PATENT DOCUMENTS

| | | | |
|---|---|---|---|
| 2,381,054 | 8/1945 | Holmes | 15/53.3 |
| 2,579,866 | 12/1951 | Rosseau | 15/53.3 |
| 2,646,586 | 7/1953 | Foutes | 15/97.3 |
| 3,035,293 | 5/1962 | Larson | 15/53.3 |
| 3,090,981 | 5/1963 | Vani et al. | 15/53.3 |
| 3,233,264 | 2/1966 | Nicki | 15/53.2 |
| 3,350,733 | 11/1967 | Hanna | 15/53.3 |
| 3,793,667 | 2/1974 | Capra | 15/53.2 |
| 3,840,931 | 10/1974 | Bivens | 15/53.3 |
| 3,868,740 | 3/1975 | Brovig | 15/88.3 |
| 3,881,208 | 5/1975 | Miner | 15/53.3 |
| 3,943,590 | 3/1976 | Hanna | 15/53.3 |
| 4,424,602 | 1/1984 | Belanger et al. | 15/97.3 |
| 4,439,883 | 4/1984 | Hanna | 15/97.3 |
| 4,470,167 | 9/1984 | Bivens | 15/53.3 |
| 4,513,467 | 4/1985 | Roncaglione | 15/53.3 |
| 4,541,874 | 9/1985 | Smith | 134/6 |
| 4,962,560 | 10/1990 | Moore | 15/53.3 |
| 5,361,443 | 11/1994 | Belanger et al. | 15/97.3 |

FOREIGN PATENT DOCUMENTS

| | | |
|---|---|---|
| 046132 | 2/1982 | European Pat. Off. . |
| 2028157 | 12/1971 | Germany . |

Primary Examiner—Mark Spisich
Attorney, Agent, or Firm—Young & Basile, P.C.

[57] ABSTRACT

A spherical bearing for a vehicle laundry brush which affords universal angular displacement freedom for the brush. The spherical bearing is mounted to the outboard end of a brush support arm and consists of a hemispherical bearing member and a complemental bearing seat. A rests on top of the bearing member for universal pivoting movement relative thereto. A brush drive motor, gear box, and a drive shaft are mounted to the bearing so that the drive shaft extends through the bearing member and is suspended in a generally vertical position. Cage members on the support arm operate with extensions associated with the spherical bearing to prevent rotation of the bearing about the brush axis. The moment of inertia of the brush components located below the pivot point is substantially greater than the moment of inertia of components mounted above the pivot point thereby providing a self-damping function. The spherical bearing is preferably formed from a bowling ball.

17 Claims, 3 Drawing Sheets

5,813,077

SPHERICAL BEARING ARRANGEMENT FOR VEHICLE LAUNDRY BRUSH

RELATED APPLICATIONS

This application is a continuation-in-part of U.S. Pat. application Ser. No. 08/641,116 filed on Apr. 29, 1996, now U.S. Pat. No. 5,709,002.

INTRODUCTION AND FIELD OF THE INVENTION

This invention is in the field of vehicle laundry implements, particularly vehicle laundry brushes, and relates more specifically to a novel support apparatus which provides increased safety and reduced maintenance by permitting a vehicle laundry brush an essentially unlimited degree of angular freedom of movement in response to an applied force.

BACKGROUND OF THE INVENTION

A vehicle laundry; i.e., a washing and/or polishing facility for motor vehicles, typically is equipped with one or more brushes having motor driven center shafts which rotate about an essentially vertical, albeit sometimes inclined or tilted, axis and arranged to contact at least the side surfaces of a vehicle being treated.

It is known to mount the side brush assembly on one or more pivot arms which permit the brush to swing inwardly and outwardly to accommodate vehicles of varying width as well as to withdraw from any contact with the vehicle on demand.

It is also known to mount vehicle side brushes in gimbal-like structures which afford two degrees of freedom for angular movement of the brush.

SUMMARY OF THE INVENTION

The present invention is an improvement to brush support systems in providing an extraordinarily simple, self-damping support for a vehicle laundry implement such as a brush compatible with swing in/swing out mounting arrangements and affording an essentially unlimited degree of freedom of angular movement of a depending brush or implement shaft in response to an applied force.

This is achieved through the use of an essentially spherical bearing member and a complemental bearing seat, one of which is mechanically arranged to carry the implement drive motor and the drive shaft such that the drive shaft passes through the universal pivot point of the bearing and extends or depends essentially vertically therefrom when at rest, but may swivel in any direction without restraint. At the same time, relative rotation between the spherical bearing and the seat about the shaft axis is restrained as hereinafter described.

In a first preferred form, the spherical bearing is hemispherical in shape, is constructed using a portion of a phenolic bowling ball or the like, and has mechanically connected thereto an upper plate member having one or more lateral extensions which are disposed within one or more caging structures which are mechanically associated with the bearing seat. The caging structures in the preferred embodiment prohibit rotation of the spherical bearing in the bearing seat about the longitudinal brush shaft axis due to the reaction torque of the drive motor but, at the same time, provide essentially no inhibiting influence on the universal pivoting motion of the hemisphere in the seat. The cages may also limit vertical travel of the brush and the spherical bearing due to a force which may tend to lift the brush; i.e., cause essentially rectilinear translation thereof along or essentially along the brush axis.

In a second preferred form of the invention, a hemispherical bearing is rigidly fixed to a pivotable support beam with its curved surface facing upward, and a bearing seat structure carrying the motor rests on top of the bearing in such a way as to be capable of swivelling over the bearing in any direction as required. The implement drive motor is attached to the bearing seat and the drive shaft extends downwardly through a tapered throughbore in the bearing. The throughbore is wider at the top of the bearing to permit the desired degree of pivoting movement of the seat relative to the bearing.

As in the first embodiment, one or more lateral projections extend from the bearing to be trapped within caging structures associated with the bearing seat, thus inhibiting undesired rotation of the brush seat and motor about the axis of the drive shaft due to motor reaction torque.

In the typical and preferred form, the brush, drive motor, spherical bearing and seat are arranged so as to provide a self-damping action wherein the motor is mounted above the universal pivot point of the spherical bearing and the brush is disposed below the universal pivot point, the brush axis serving as the mechanical connection between the two and, of course, passing in all operating orientations through the universal pivot point. The mass of the motor is less than the mass of the brush and, moreover, is located a shorter distance above the universal pivot point than the brush center of gravity is below the universal pivot point. Accordingly, the moment of inertia of the brush below the pivot point is substantially greater than the moment of inertia of the motor and associated components above the universal pivot point. This moment unbalance, combined with the friction in the bearing itself, makes the support arrangement essentially self-damping and, in the ordinary implementation, provides safety and a reduced probability of brush damage without the need for gimbals and damping mechanisms such as pneumatic and hydraulic cylinders.

According to a further feature of the invention, the spherical bearing is a hemisphere resembling or actually made from a common and commercially available bowling ball having a phenolic surface. Bowling balls are well suited for such an application as they exhibit excellent sphericity, smoothness and wear resistance, and are relatively inexpensive.

DETAILED DESCRIPTION OF THE PREFERRED EMBODIMENT

Figure 1:
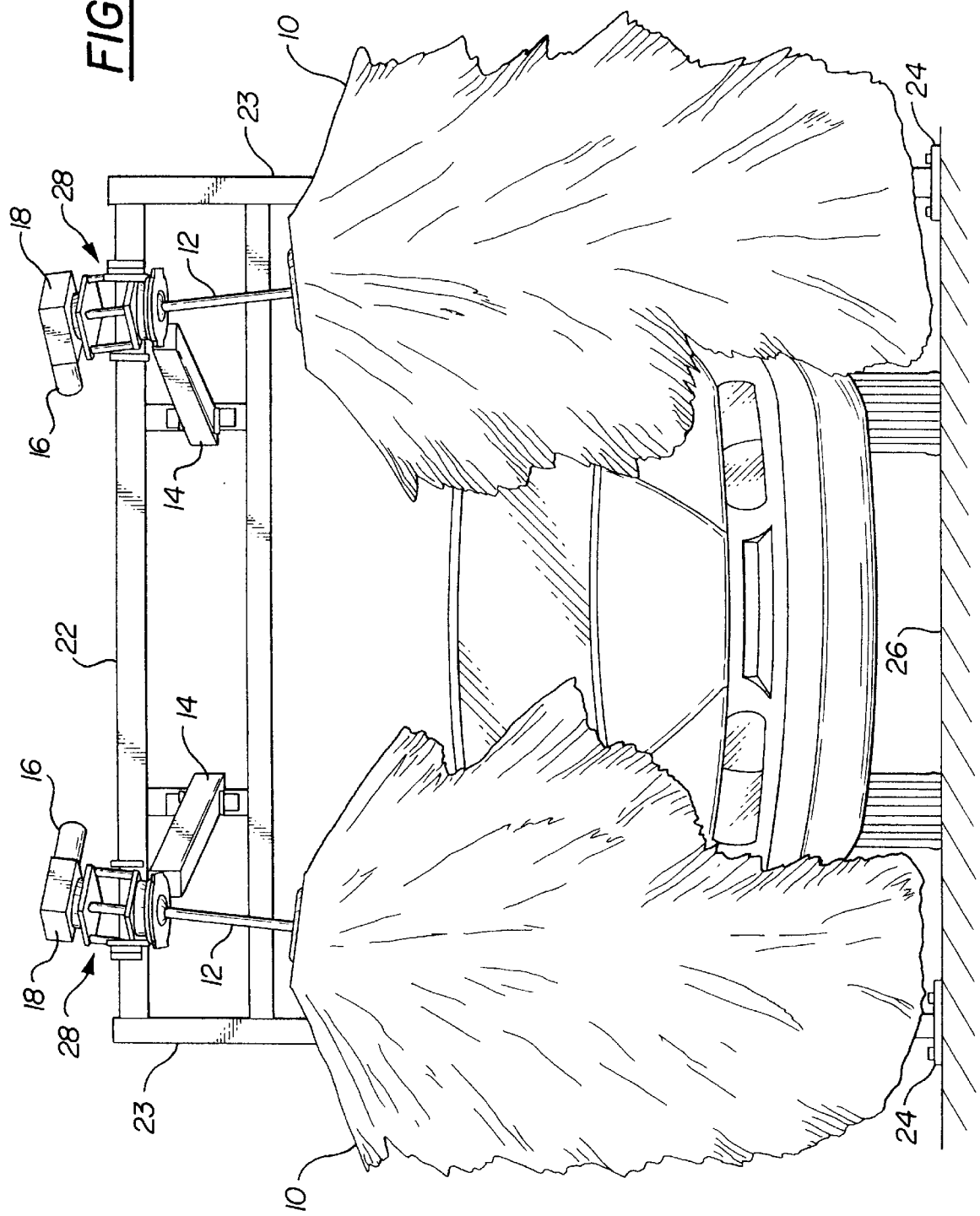
FIG. 1 is a perspective view of two brushes incorporating the inventive support in a vehicle laundry environment.

Referring to FIG. 1, two vehicle brushes 10 are of the radially extending cloth element type, each having an essentially vertically oriented drive shaft 12 mounted on the outboard end of an aluminum beam or swing arm 14. Swing arms 14 are biased inwardly to urge brushes 10 into contact with a vehicle travelling along a vehicle laundry lane 26. Shafts 12 are driven rotationally to activate the brush elements by respective motors 16 having associated gear boxes 18.

The brush 10 may be constructed in the manner described in applicants' co-pending application, Ser. No. 08/641,024, filed Apr. 29, 1996, the entire disclosure of such application being incorporated herein by reference.

Swing arms 14 are pivotally connected to a support structure 22 having two uprights 23 which terminate at their lower ends in base plates 24, the plate being suitably bolted in place adjacent to and either side of the laundry lane 26. The arrangement shown in FIG. 1 contemplates a stationary vehicle laundering apparatus and means such as a conventional conveyor to cause slow movement of the vehicles to be treated along the wash lane 26 where they contact one or more washing implements such as side brushes, overhead brushes, and blower nozzles as will be apparent to those familiar with the vehicle laundry technology. It is to be understood, however, that the invention hereinafter described is also usable in connection with moveable gantry type systems wherein the washing apparatus moves relative to a stationary vehicle and further that the invention is susceptible of use in connection with other types of vehicle laundry apparatus such as polishing brushes or even abrasive implements.

Brush 10 and the associated drive components including shaft 12, motor 16 and gear box 18 are supported by apparatus 28 for universal pivotal or swiveling movement so as to permit the brush to adjust in position relative to a vehicle and/or to be readily moved out of harm's way upon occurrence of even relatively small side loads applied in any direction. This apparatus comprises a spherical bearing member 30 and a seat 50 attached the swing arm 14 for receiving the spherical bearing member 30 as hereinafter described in greater detail with reference to FIGS. 2 and 3.

Figure 2:
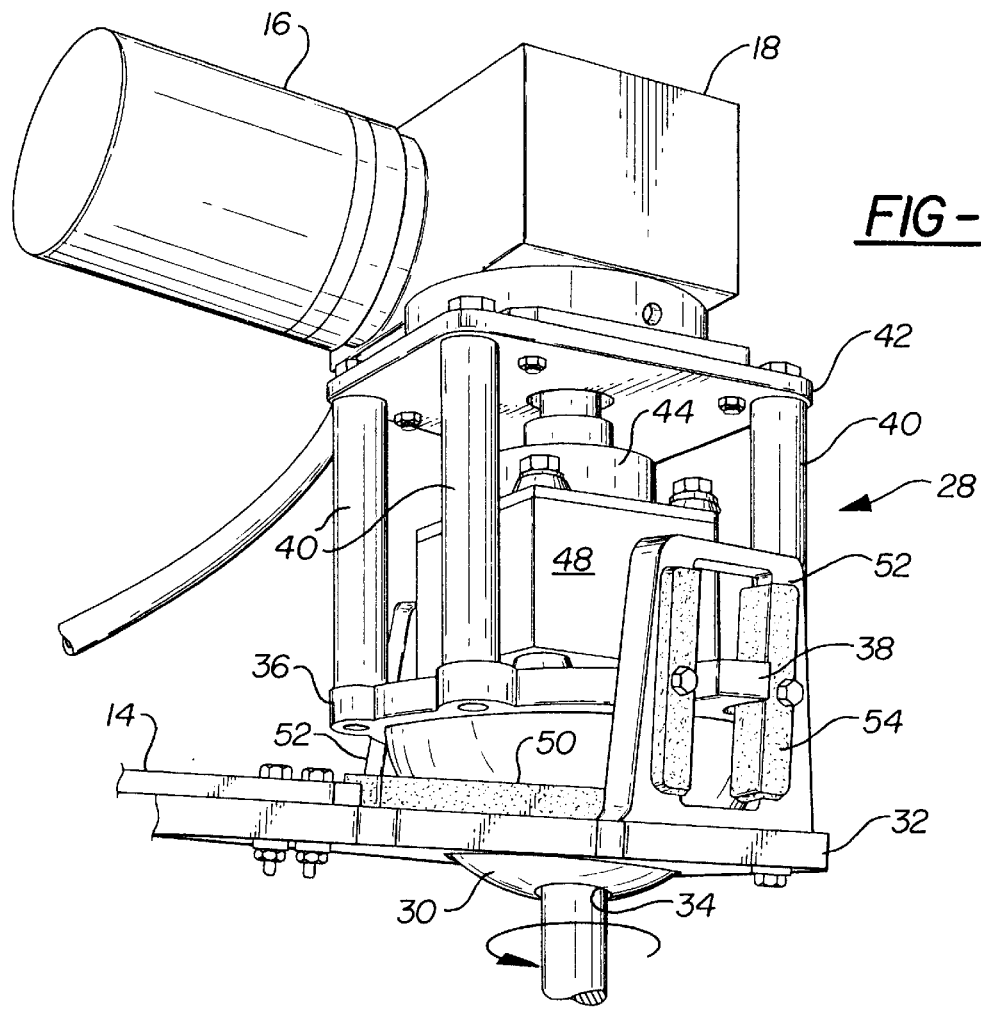
FIG. 2 is a perspective view of the spherical bearing of FIG. 1 and the motor support thereover.

Referring now to FIG. 2 the apparatus 28 is shown in greater detail to comprise an 8 inch diameter spherical bearing 30 of suitable hard plastic or phenolic material. The term "spherical" is to be construed to include full spheres as well as portions of a sphere; in this case the body 30 takes the shape of the lower half portion of a sphere and is formed with a vertical throughbore 34 which passes through the geometric center of the sphere; i.e., the common radius which lies in the center of the flat equatorial upper plane of the body 30. The throughbore 34 accommodates the brush drive shaft 12 in spaced; i.e., non-binding, relationship as hereinafter described.

Secured by means such as screws to the top plane of the spherical bearing 30 is a base plate 36 which is preferably formed of aluminum stock and which has a pair of diametrically opposite lateral extensions or ears 38. Aluminum pillars 40 are bolted to the base plate 36 in a quadrangular arrangement to support an upper plate 42 which lies in spaced parallel relationship to the lower plate 36. Mechanically secured to the upper plate 42 are the motor 16, gear box 18, and a spacer 44. In the arrangement shown in FIG. 2, the motor 16, which may be either electric or hydraulic, has an essentially horizontal output shaft (not shown) which extends into the gearbox 18. The gearbox 18 performs the functions of speed reduction and turning the drive direction through an angle of 90° so that it can be coupled to the shaft 12. The speed reducer/gear box 18 has an output shaft which extends downwardly through the spacer 44 and a coupling to a bearing box 48 to the brush drive shaft 12 which extends downwardly through the bore 34 in the spherical bearing 30.

The bearing 30 sits in a ring-like plastic seat 50 having a spherically milled bearing surface and which in turn is bolted to the top surface of a support plate 32 which is carried on the outboard end of the swing arm 14. Since the internal surface of the seat 50 conforms to the external surface configuration of the spherical bearing 30, the entire unit consisting of spherical bearing 30, the plates 36 and 42, the motor 16, the gear box 18, and the brush shaft 12 is susceptible of essentially universal pivoting angular movement about the pivot center; i.e., the geometric center of the bearing 30, upon application of the applied force to the unit. An applied force typically arises out of contact between the brush 10 and the surface of a vehicle.

It should be noted that bearing seat 50 need not be a complete ring, but could consist of three or more smaller seats distributed around a ring-like holder and which contact the bearing at discrete locations.

In a preferred embodiment of the invention, bearing 30 comprises half of a standard, commercially available bowling ball. Bowling balls have been found to be remarkably well suited for use in the invention support apparatus, as they have a phenolic outer layer exhibiting excellent sphericity, smoothness and wear resistance, and are relatively inexpensive. Further, the dense, cement-like polyester material which composes the interior of some bowling balls is stable and may readily be drilled to form throughbore 34 and to provide mounting holes for attaching base plate 36 to the bearing.

Because the spherical bearing 30 sits in the spherical surface of the ring-like seat 50 and is moveable therein with relatively little frictional resistance, it is apparent to those skilled in the mechanical arts that operation of motor 16 and the resulting rotation of brush shaft 12 and brush 10 produces a reaction torque which would tend to rotate the bearing 30 in the seat 50 in a direction opposite to that of the applied rotation of shaft 12. To prevent such rotation, a pair of machined aluminum cage members 52 are bolted at diametrically opposite positions on the support plate 32 and have rectangular vertically oriented openings therein which receive and cage the lateral projecting ears 38 of the base plate 36 secured to the top of the spherical bearing 30. Nylon bumpers 54 are secured to the opposite vertical inner surfaces of the cage members 52 for wear control purposes. The cages 52 effectively trap the ears 38 and prevent rotation of the base plate 36 in reaction to the rotation of the shaft 12, but do not restrict the universal pivotal motion of the bearing 30 in the seat 50 in any direction to any degree. In addition, the closed tops of the cage members 52 restrict vertical motion of the brush unit relative to the seat 50 and support plate 32 such as might occur by application of a force extending essentially along the brush shaft tending to lift the brush shaft and bearing 30 off of the seat.

Figure 3:
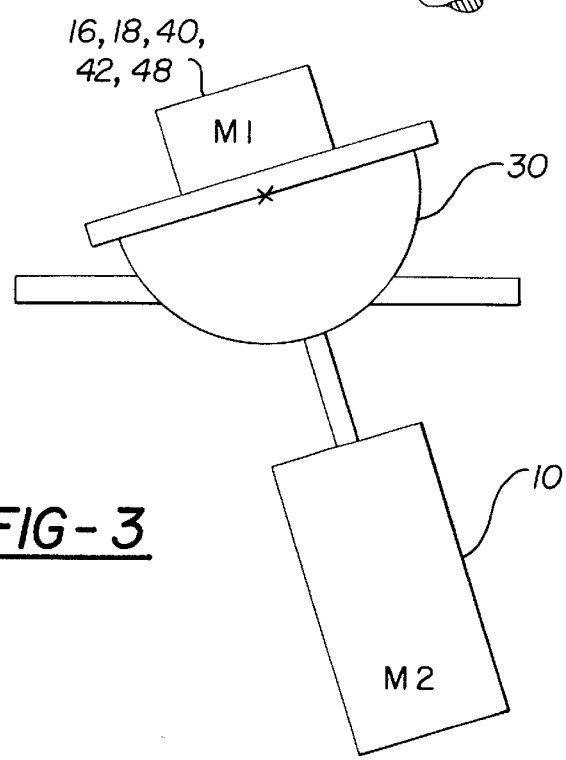
FIG. 3 is a schematic diagram of the relative moments of inertia of the structure of FIG. 1.

Reference to FIG. 3 provides insight into the preferred relationships between the physical parameters of the system of FIG. 1. FIG. 3 is a schematic diagram of the apparatus of FIGS. 1 and 2 and illustrates the fact that the mass M1 of the motor 16 and gear box 18 and associated components is located above the universal pivot center, while the mass M2 of the brush 10 and the shaft 12 is below the universal pivot center. Moreover, the arm of the moment M2 is much greater than the arm of M1. In a typical commercial apparatus, M1 is on the order of 100–150 lbs. whereas M2 is on the order of 400 lbs. for a dry brush and 450–500 lbs. for a brush when wet. The arm of M1 is typically between 4" and 12" whereas the arm for M2 is between 2'–4'. Accordingly, the moment of inertia of the mass below the pivot center is substantially greater and typically between about 4 and 10 times the moment of inertia of the upper mass M1 relative to the pivot center. This provides a substantial degree of self-damping and typically eliminates the need for additional damping mechanisms such as pneumatic and/or hydraulic cylinders.

In the side-by-side, dual brush vehicle laundry shown in FIG. 1, the combined effect of the universally pivotable, inertially damped brushes 10 and the inwardly biased, laterally pivotable swing arms 14 allows the brushes to perform in a "wrap-around" manner. The brushes are initially positioned close together in the center of the laundry lane so as to treat the front of the vehicle when it first comes into contact with the brushes. As the vehicle continues to move forward, the force exerted on the brushes by the vehicle causes the brushes to pivot away from the vehicle and the swing arms to simultaneously spread apart so that the vehicle moves between the brushes. The vehicle continues along the lane and the brushes treat the sides of the vehicle, with the combination of the inertial force of the brush units and the biasing force of the seeing arms applying a degree of pressure on the vehicle surfaces great enough to achieve proper cleaning while not so great as to risk damage to the vehicle or accessories such as side view mirrors, radio antennae, etc. When the vehicle has moved all but completely past the brushes, they pivot inwardly to clean the rear surfaces of the vehicle. Accordingly, a pair of brushes mounted according to the present invention are able to clean or otherwise treat the front, side and rear vertical surfaces of a vehicle.

Figure 4:
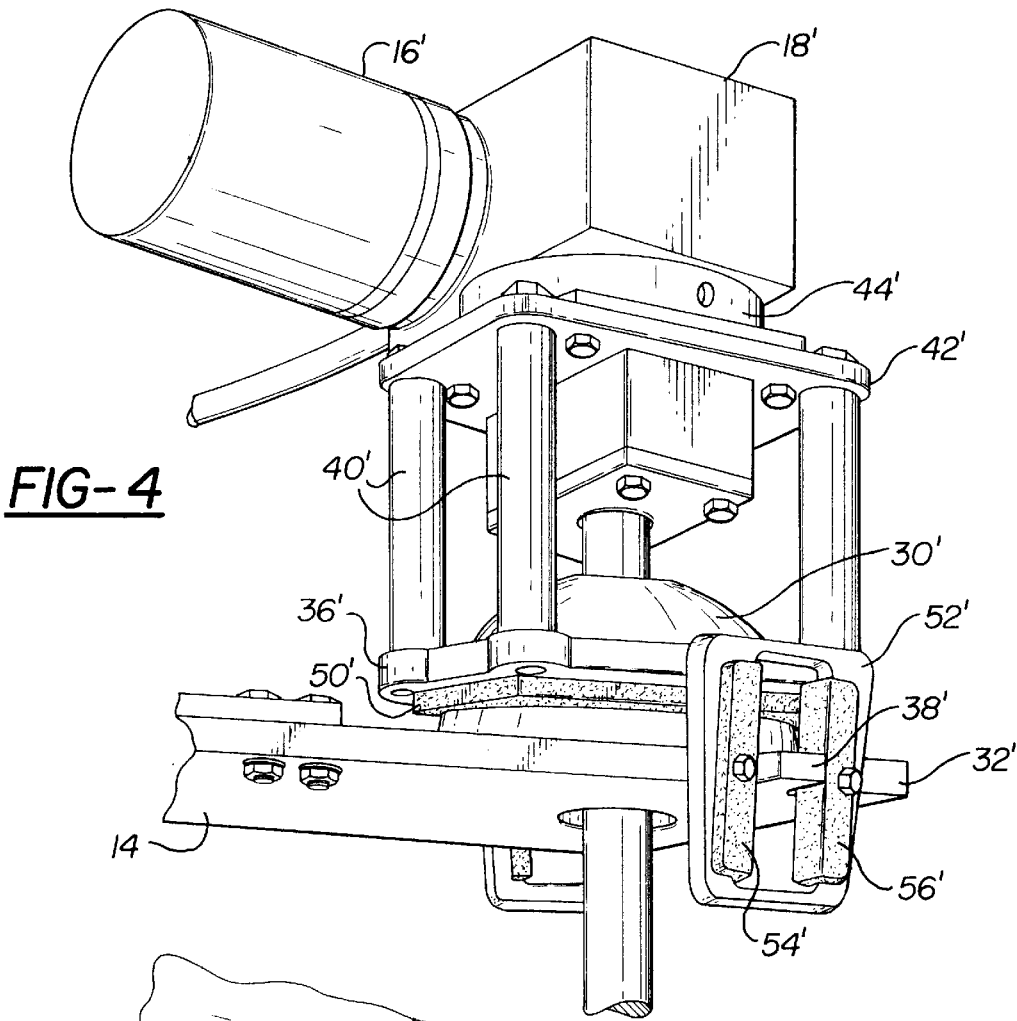
FIG. 4 is a perspective view of a second embodiment of the invention spherical bearing and motor support.
Figure 5:
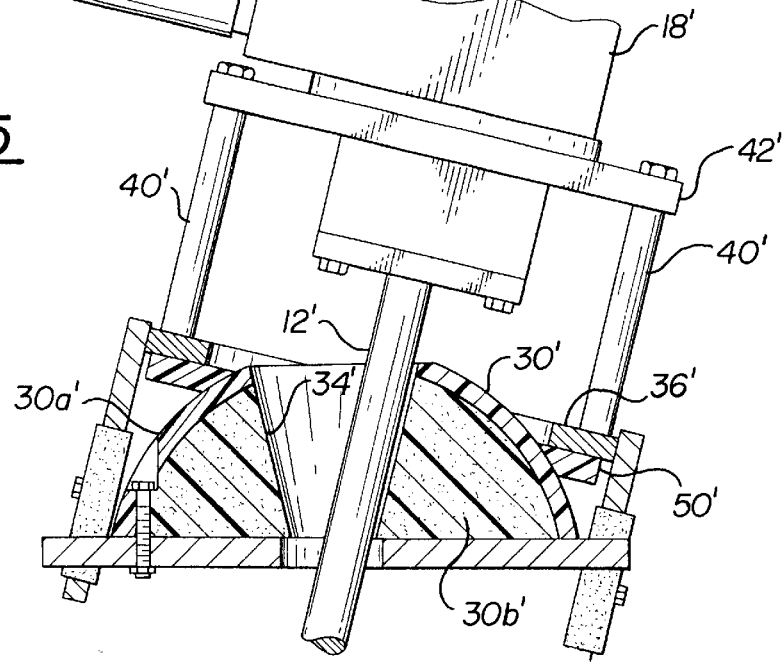
FIG. 5 is a partially sectioned view of the bearing and motor support structure of FIG. 4.

An alternative embodiment of a spherical bearing mounting apparatus for a vehicle side brush is depicted in FIGS. 4 and 5. In the alternative embodiment, a support plate 32' is attached to swing arm 14 and a spherical bearing 30' is rigidly fixed to the upper surface thereof. Bearing 30' has a surface layer 30a' of suitable hard plastic or phenolic material and a core 30b' of a dense polyester material. In this embodiment, spherical bearing 30' takes the shape of the upper half portion of a sphere and has a tapered, funnel-shaped throughbore 34' passing substantially vertically through the geometric center of the sphere.

An aluminum base plate 36' has a ring-like plastic bearing seat 50' bolted to the lower surface thereof, and together they rest on the curved, upper surface of bearing 30'. Seat 50' has a spherically milled, downward facing bearing surface which conforms to the external surface curvature of spherical bearing 30' when resting thereon. Aluminum pillars 40' are bolted to the base plate 36' in a quadrangular arrangement to support an upper plate 42' which lies in spaced parallel relationship to the lower plate 36'. A motor 16', a gear box 18', and a spacer 44' are configured in substantially the same manner as in the first embodiment described herein, being fixed to the upper plate 42'. Drive shaft 12' extends downwardly from gear box 18' and through throughbore 34' of bearing 30', as best seen in FIG. 5.

A pair of machined aluminum cage members 52' are bolted at diametrically opposite positions on the base plate 36', extending downwardly therefrom to bracket support plate 32'. As in the first described embodiment, cage members 52' have rectangular, vertically oriented openings therein and nylon bumpers 54' and 56' are secured to the opposite vertical inner surfaces of the openings. A pair of diametrically opposite lateral extensions or ears 38' project from support plate 32' and are trapped within the rectangular openings of cages 52' to prevent rotation of base plate 36' such as would tend to be induced by the rotation of shaft 12' and brush 10. In addition, the closed lower ends of the cage members 52' restrict vertical motion of the brush unit relative to support plate 32' such as might occur by application of a force exerted essentially along the brush shaft tending to lift the seat 50' off of bearing 30'. It is important that ears 38' project along a line passing through or close to the universal pivot center of bearing 30', so that they do not undesirably restrict pivoting movement of seat 50'.

Throughbore 34' passes through the universal pivot center of bearing 30' and widens toward the top of bearing 30', as seen in FIG. 5. The resulting tapered shape provides the necessary clearance for shaft 12' as seat 50' and the components attached thereto pivot about bearing 30'.

Whereas a preferred embodiment of the invention has been illustrated and described in detail, it will be apparent that various changes may be made in the disclosed embodiment without departing from the scope or spirit of the invention.

The invention claimed is:

1. For use in combination with a surface treatment implement of the type having a drive shaft extending in a generally vertical direction and a surface contacting implement carried thereon, a support apparatus comprising:

a hemi-spherical bearing;

a seat cooperating with said bearing for providing relative universal pivoting movement between the bearing and seat; and means for mounting said shaft and implement in depending relation to said seat, such that said shaft passes freely through said bearing.

2. Apparatus as defined in claim 1 wherein said implement is characterized by a complete absence of motion-limiting restraints in contact with said shaft below said seat.

3. Apparatus as defined in claim 1 further including a motor for rotating said shaft about its own longitudinal axis.

4. Apparatus as defined in claim 1 further including means for limiting relative rotation between the bearing and seat about the axis of said shaft.

5. Apparatus as defined in claim 1 further including means for limiting travel of the seat relative to the bearing along the axis of said shaft.

6. Apparatus as defined in claim 1 further including an implement support arm, said bearing being connected to and carried by said support arm.

7. Apparatus as defined in claim 1 further including:

a support structure mounted on the seat;

a motor carried by the support structure and having a center of mass which is above a universal pivot center common to said bearing and said seat, said shaft extending from the motor and through the bearing and the universal pivot center;

means for limiting rotation of the seat relative to the bearing;

the moment of inertia of said implement below the universal pivot center being substantially greater than the moment of inertia of the motor and support structure above the universal pivot center.

8. Apparatus as defined in claim 7 wherein the moment of inertia of said implement below the universal pivot center is approximately 4 to 10 times greater than the moment of inertia of the motor and support structure above the universal pivot center.

9. Apparatus as defined in claim 1 further including:

at least one lateral extension projecting laterally with respect to said bearing; and cage means associated with said seat for laterally and vertically surrounding said at least one lateral extension for limiting vertical travel of said seat and rotation of said seat about the axis of said shaft but without significantly limiting the universal pivotal movement of the seat with respect to said bearing.

10. Apparatus as defined in claim 1 wherein said semispherical bearing comprises at least a portion of a bowling ball having an organic surface layer.

11. A vehicle laundry brush assembly comprising:

a shaft;

a brush operated by rotating the shaft;

a motor for rotating the shaft;

a spherical bearing; and a bearing seat resting on the spherical bearing for suspending the shaft, motor and brush with the shaft passing through the bearing in a generally vertical orientation and permitting the shaft essentially 360° of angular freedom of movement about a universal pivot center common to said bearing and seat.

12. Apparatus as defined in claim 11 further including:

means associated with said bearing and having at least one lateral extension projecting laterally therefrom; and cage means associated with said seat for laterally and vertically surrounding said at least one lateral extension for limiting vertical travel thereof and rotation of said seat about the shaft axis but without significantly limiting the universal pivotal movement of the seat over the bearing.

13. Apparatus as defined in claim 11 wherein the shaft is unsupported below the bearing seat.

14. Apparatus as defined in claim 11 wherein the motor is mounted above the universal pivot center and the brush is mounted below the universal pivot center, the moment of inertia of the brush being substantially greater than the moment of inertia of the motor about the universal pivot center.

15. Apparatus as defined in claim 14 wherein the moment of the brush below the universal pivot center is approximately 4 to 10 times greater than the moment of the motor above the universal pivot center.

16. For use in combination with a vehicle laundry implement of the type having a motor, a drive shaft driven by the motor and extending in a generally vertical direction, and a vehicle contacting implement carried on the drive shaft, a support apparatus comprising:

a spherical bearing and bearing seat for suspending the shaft, motor and implement with the shaft in a generally vertical orientation and permitting the shaft essentially 360° of angular freedom of movement about a universal pivot center common to said spherical bearing and seat, the spherical bearing comprising at least a portion of a bowling ball.

17. A vehicle laundry brush assembly comprising:

a drive shaft;

a brush operated by rotating the shaft;

a motor for rotating the shaft;

a bearing member having a hemispherical bearing surface;

a bearing seat for receiving said hemispherical member, said bearing seat and bearing member cooperating to suspend the shaft, motor and brush with the shaft in a generally vertical orientation; and means for restraining relative rotation between the bearing member and the seat about a vertical axis while permitting the shaft and brush essentially omnidirectional angular freedom of movement about a universal pivot center common to the bearing member and the seat.

* * * * *